United States Patent [19]

Tansey et al.

[11] Patent Number: 4,930,860
[45] Date of Patent: Jun. 5, 1990

[54] PROPELLABLE OPTICAL FIBER CABLES

[75] Inventors: John A. Tansey, Runcorn; Rodney J. Davey, Prescott; Alan A. Sadler, Warrington, all of England

[73] Assignees: BICC plc, London; Corning Limited, Sunderlan, both of England

[21] Appl. No.: 207,661

[22] Filed: Jun. 16, 1988

[30] Foreign Application Priority Data

Jun. 17, 1987 [GB] United Kingdom ............. 8714226

[51] Int. Cl.$^5$ ............................................. G02B 6/44
[52] U.S. Cl. ................................................. 350/96.23
[58] Field of Search ..................................... 350/96.23

[56] References Cited

U.S. PATENT DOCUMENTS

| | | | |
|---|---|---|---|
| 4,143,942 | 3/1979 | Anderson | 350/96.23 |
| 4,629,285 | 12/1986 | Carter et al. | 350/96.23 |
| 4,740,053 | 4/1988 | Cassidy | 350/96.23 |
| 4,832,441 | 5/1989 | Barnes et al. | 350/96.23 |

FOREIGN PATENT DOCUMENTS

| | | | |
|---|---|---|---|
| 108590 | 5/1984 | European Pat. Off. | 350/96.23 |
| 136913 | 4/1985 | European Pat. Off. | 350/96.23 |
| 157610 | 10/1985 | European Pat. Off. | 350/96.23 |
| 186753 | 7/1986 | European Pat. Off. | 350/96.23 |
| 3526823 | 5/1987 | Fed. Rep. of Germany | 350/96.23 |
| 2096343 | 10/1982 | United Kingdom | 350/96.23 |
| 2156539 | 10/1985 | United Kingdom | 350/96.23 |
| 2156837 | 10/1985 | United Kingdom | 350/96.23 |

*Primary Examiner*—Frank Gonzalez

[57] ABSTRACT

An optical fibre cable comprises a plurality of optical fibre structures each of which comprises an optical fibre surrounded by at least one sheath layer. The optical fibre structures are separably held together side-by-side. The optical fibre cable is propellable along a tubular pathway by fluid drag of a gaseous medium passing over the cable, and each of the individual optical fibre structures is preferably also so propellable when the said structures are separated from one another.

11 Claims, 4 Drawing Sheets

PROPELLABLE OPTICAL FIBER CABLES

This invention relates to optical fiber cables.

EP-A-108590 describes a method of installing an optical fiber cable in which the cable is propelled along a previously installed duct by fluid drag of a gaseous medium, preferably air, blown along the duct in the desired direction of cable advance. EP-A-108590 describes a number of designs of cables for installation using the method of the invention (hereinafter referred to as the "blown fiber method"), but preferred cable designs for use in the blown fiber method are described in EP-A-157610. The designs of EP-A-157610 use an inner sheath containing one or more optical fibers, and an outer sheath containing one or more optical fibers, and an outer sheath containing the inner sheath. The outer sheath is of a material having a low density, for example a foam, and it is this which reduces the overall density of the cable to a value sufficiently low for it to be blown satisfactorily.

Where a plurality of fibers is contained within the inner sheath the design of EP-A-157610 makes it possible in a single blowing operation to install a plurality of fibers. However, in order to use the installed cable, each end of each fiber must then be connected to an external device, for example into equipment at a telephone exchange of a telephone system provider at one end and into user's telephone equipment at the other end. At least at the user's end the various fibers will often need to terminate at points which are widely spaced apart, and so it would be desirable for the fibers to be separated from one another at the point where the cable enters the user's premises and the fibers each individually routed to the desired destination. This is difficult to achieve with the designs shown in EP-A157610. For one thing, the individual fibers are very slender (typically each is 0.25 mm in diameter) and therefore very inconvenient to handle. Furthermore, at least in those forms of the design of EP-A-157610 in which the fibers are held in close contact with one another when the inner sheath is removed there remains at the entry point to the inner sheath an area of localized stress, and it is also found that some increase in transmission loss can occur as a result of the process in which the inner sheath is applied to hold the fibers tightly together.

An object of the present invention is to provide a cable in which the stresses of the optical fibers resulting from manufacture, installation and operation are reduced, whilst maintaining good "blow-in" properties.

According to the present invention there is provided an optical fiber cable comprising a plurality of optical fiber structures each of which comprises an optical fiber surrounded by at least one sheath layer, the said optical fiber structures being separably held together side-by-side, the optical fiber cable being propellable along a tubular pathway by fluid drag of a gaseous medium passing over the cable. Preferably each of the said optical fiber structures is also so propellable when the said structures are separated from one another. The problem of increased transmission-loss referred to above is avoided, at least in preferred form of the invention, by the fact that the optical fibers structures are not held tightly to one another. Furthermore, the or each sheath layer on each optical fiber may be easily removed when preparing the ends for termination, e.g. in a connector.

A variety of cross-sectional geometries are possible for the optical fiber cable. It is advantageous to choose a geometry which maximizes the ratio of perimeter to cross sectional area. For example, the individual fiber structures may be arranged with their centers along a straight line or so as to form a rectangular array, or the individual fiber structures may be arranged around a central member.

A number of embodiments of the invention are shown in the accompanying drawings, which are not to scale, in which.

Figure 1:
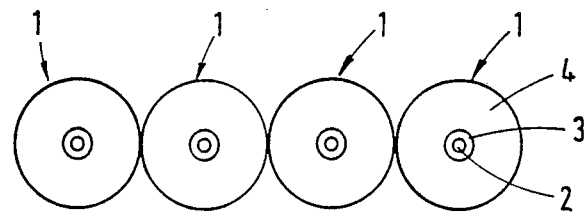
FIGS. 1 to 10 show diagrammatically cross-sections through ten embodiments.

The embodiment of FIG. 1 comprises four fiber structures 1 arranged with their centers along a straight line and in contact edge to edge. It should be noted that although FIG. 1 shows four fiber structures there could be only two or three such structures, or more than four structures. The same is true of the other embodiments. Each fiber structure 1 comprises an optical fiber 2, for example of silica, having a diameter typically of 0.125 mm, a layer of UV-cured acrylate resin 3 to bring the diameter of the fiber 2 + resin 3 up to 0.25 mm, and a sheath 4 of a low density material, for example a foam of a polymeric material such as polyethylene having a density of about 0.5 g/ml and a Young's modulus of about 100 N/mm$^2$ to bring the overall diameter up to between about 0.3 and 1.0 mm, preferably between about 0.4 and 0.6 mm. The fiber structures are held to one another in a separable manner by heating to cause the structures to fuse to one another, by use of a suitable adhesive, or in any other desired manner. The small area of contact between the adjacent fiber structures helps to ensure that the structures are readily separable from one another, though not so readily separable as to become detached while the cable is being blown. The cable shown in FIG. 1 is blowable by the blown fiber method, and each individual fiber structure 1, after separation from adjacent fiber structures, is also individually blowable by that method.

Figure 2:
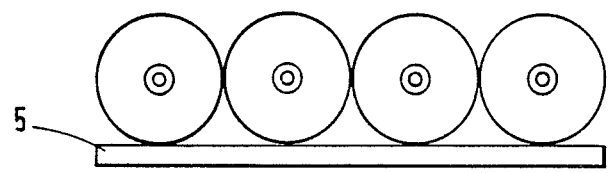
Figure 3:
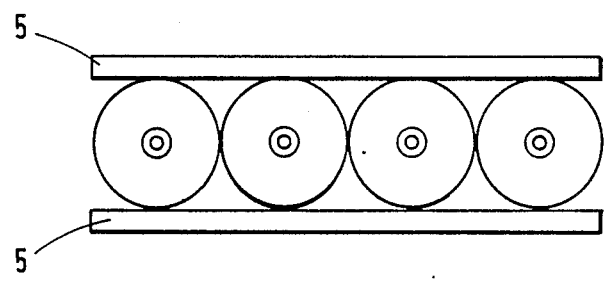

The embodiment of FIG. 2 differs from that of FIG. 1 in that instead of the fiber structures 1 being bonded to one another they are all bonded, side by side, to a ribbon-shaped film 5. The bonding to the film 5 could be achieved using heat bonding, an adhesive or any other suitable method. The fiber structures 1 can be separated from one another by peeling away the film 5. The embodiment of FIG. 3 differs from that of FIG. 2 in that two films 5 are provided, between which the fiber structures 1 are sandwiched. The film can be chosen to be suitable for accepting a printed identification legend or length marks.

Figure 4:
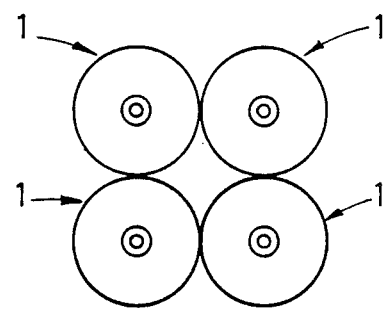
Figure 5:
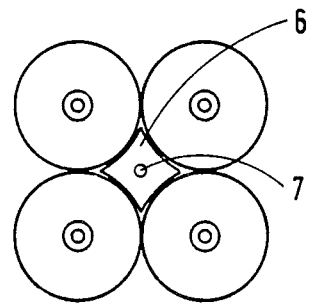

A different geometry is used in FIG. 4, with the centers of four fiber structures being located at the corners of a square. The individual fiber structures are edge-bonded to one another. The embodiment of FIG. 5 uses the same geometry as FIG. 4, except that here the fiber structures 1 are not bonded to one another but are instead all bonded to a central member 6. One way of producing the structure of FIG. 5 is to start with a central member 6 having a circular cross-section and made of a material which is sufficiently deformable that when four individual fiber structures are brought into contact with it will deform into the shape shown in FIG. 6. FIG. 5 also illustrates the provision in the central member 6 of a reinforcing member 7 to give the cable added strength. It should be understood, however, that the reinforcing member 7 is optional.

Figure 6:
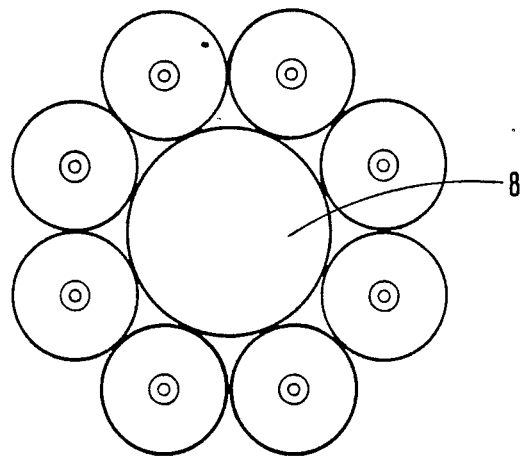

FIG. 6 shows an arrangement which, in some respects, resembles that of FIG. 5, in that a plurality of optical fiber structures, in this case eight, are grouped around a central member, which in this case is a cylindrical rod 8. The structures 1 are each bonded to the central member 8. If desired, a reinforcing member (not shown) similar to the member 7, could be provided in the central member 8.

Figure 7:
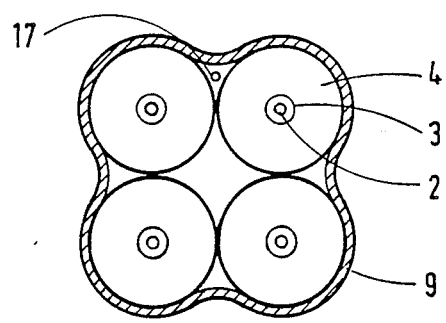

The embodiment of FIG. 7 is produced by passing a plurality of optical fiber structures (four are shown) together, optionally with a rip cord 17 or a plurality of such rip cords, through a material such as a latex solution to leave a thin film 9 of the material surrounding the structure and holding them together. It is to be noted, however, that film 9 does not exert any substantial compressive force on the individual fibers, which could impair their optical properties. The same is true of the embodiments described below with reference to FIGS. 8 and 9, and the substantial absence of a compressive force is also true of the embodiment of FIG. 10 where there is no film 9 but there is an outer covering 12. The individual fiber structures can readily be separated from one another.

Figure 8:
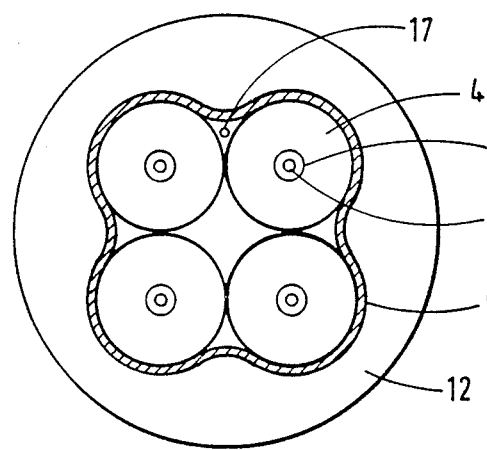

Instead of, or in addition to, the application of film 9, the bundle of fiber structures can be surrounded by an extruded outer covering of solid or cellular material. An embodiment in which there is both a film and an outer covering is shown in FIG. 8, where the outer covering is denoted by reference numeral 12. The outer surface of the covering 12 may be cylindrical, as shown, or it may have one or more flat surfaces, for example so as to give a rounded square cross-section. The provision of a flat surface makes the covering 11 easier to mark with an identification legend or length marks, and it is also preferred for this purpose that the outer covering should be translucent or opaque.

Figure 9:
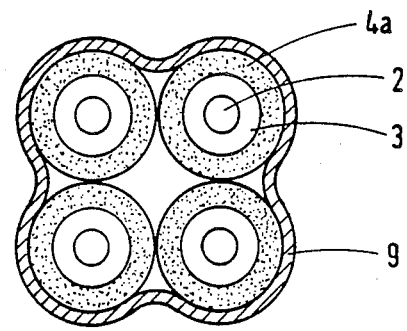

The embodiment of FIG. 9 differs from that of FIG. 7 in that the sheath 4 is replaced by a sheath 4a consisting of reinforcing fibers, for example of Kevlar (Registered Trade Mark) or polyester, either fully or partially impregnated with a bonding resin, for example latex or other solvent-borne resin or reactive resin. In a modification of what is shown in FIG. 9 the reinforcing fibers are omitted, in which case the cross-sectional appearance is substantially the same as that of FIG. 7.

Figure 10:
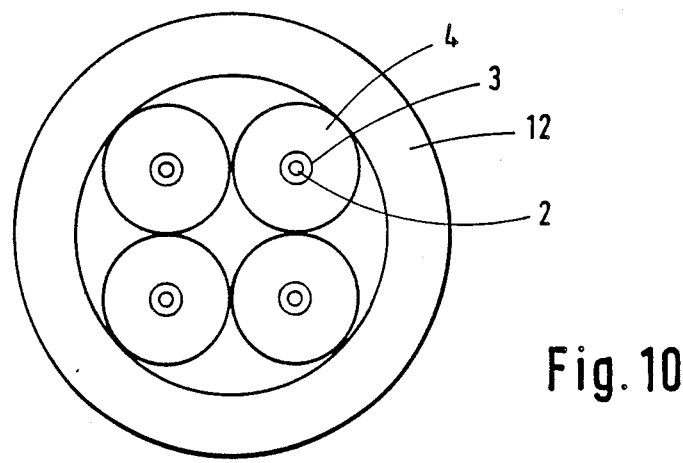

The embodiment of FIG. 10 is similar to that of FIG. 8, except that the film 9 is omitted and the rip cord 17 also. The outer covering 12 holds the individual fiber structures 4 together.

Figure 11:
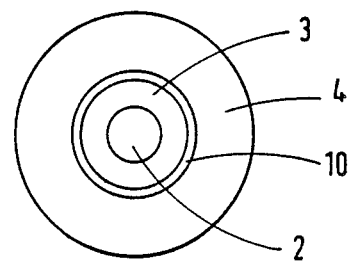
FIG. 11 is a diagrammatic cross-section through a double-sheathed form of fiber structure, which may be used in place of the single sheath forms shown in FIGS. 1 to 10.

In the embodiments of FIGS. to 10 each structure 1 has been shown as consisting of an acrylate-coated silica fiber surrounded by a single sheath. An alternative form of optical fiber structure for use in the present invention is shown in FIG. 11, on a larger scale. This comprises an additional inner sheath 10 surrounding the acrylate layer 3. The sheath 10 can be used to form a protective layer, for example to protect the optical fiber from chemical attack, from mechanical impact or from other external influences, or as an aid to preparing the ends for connections. Another use for the sheath 10 is to compensate for the effects of differences between the temperature coefficient of expansion of the silica 2, the acrylate 3 and the foam 4. Typically the temperature coefficient of expansion of the silica is of the order of 100 times less than that of the acrylate and foam, and the stresses to which this gives rise can be compensated for by a sheath 10 having an appropriate cross-sectional area, Young's modulus and thermal coefficient of expansion. The sheath 10 would preferably be of a material having a very low thermal coefficient of expansion, for example a liquid crystal polymer or other suitably formulated polymer. The sheath 10 may also be used to provide a degree of reinforcement similar to that afforded by the reinforcing member 7, i.e. it may take part of the tensile stress applied to the cable.

A further modification is for the individual fiber structures to be all-plastic fibers, instead of acrylate-coated silica fibers.

In use, the leading end of a cable as is described above may be blown through a duct to a user's premises, with a sufficient length of the cable protruding from the duct to allow the individual fiber structures to be routed separately to different parts of the user's premises. To achieve this, the portion of the cable protruding from the duct is separated into its individual fiber structures, and each fiber structure is then individually blown through a duct within the user's premises to the desired point. The invention therefore reduces the need for optical fiber splices. This is beneficial in reducing optical transmission loss and in reducing the need for splicing equipment and technicians during installation. A further benefit occurs in that, at the point between the external and the internal ducts, the space within the ends of each duct, between the surfaces of the fiber structure and the internal surfaces of the microducts, can be filled so as to form a gas block. The use of individually sheathed fibers allows this to be done more efficiently and effectively than is the case with bundled fibers not having individual sheaths.

It will be understood that various modifications are possible to the cables described above and to their method of production. For example, instead of forming the sheath 4 of a foam, the sheath could be of some other suitably lightweight material. Also, the material of the sheath 4, whether foam or otherwise, could be colored, either throughout or wholly or partly on the surface, in order to assist identification.

As regards methods of producing the cable, one modification to what is described above, is to extrude the cable. For example, the embodiments shown in FIGS. 1 and 4 could be formed by feeding four acrylate coated optical fibers to an extrusion die in which the foam layers 4 were applied around the optical fibers in such a manner that the individual foam layers were connected to and bonded with one another. As for the structures shown in FIGS. 2 and 3, these also could be extruded in a single operation provided the films 5 were made of the same material as the sheath layers 4.

The above description has been mainly in terms of using fiber structures 1 which, when separated, are individually blowable. However, the invention can also be used where this is not the case. The individual fibers would then need to be installed by a conventional installation technique, i.e. not by the blown fiber method, and in order to protect them during such installation sleeves would desirably be fitted over the individual fibers for protection. Indeed, even when using the embodiments described above, the fiber structures could be installed by conventional techniques, with or without protective sleeves.

Figure 12:
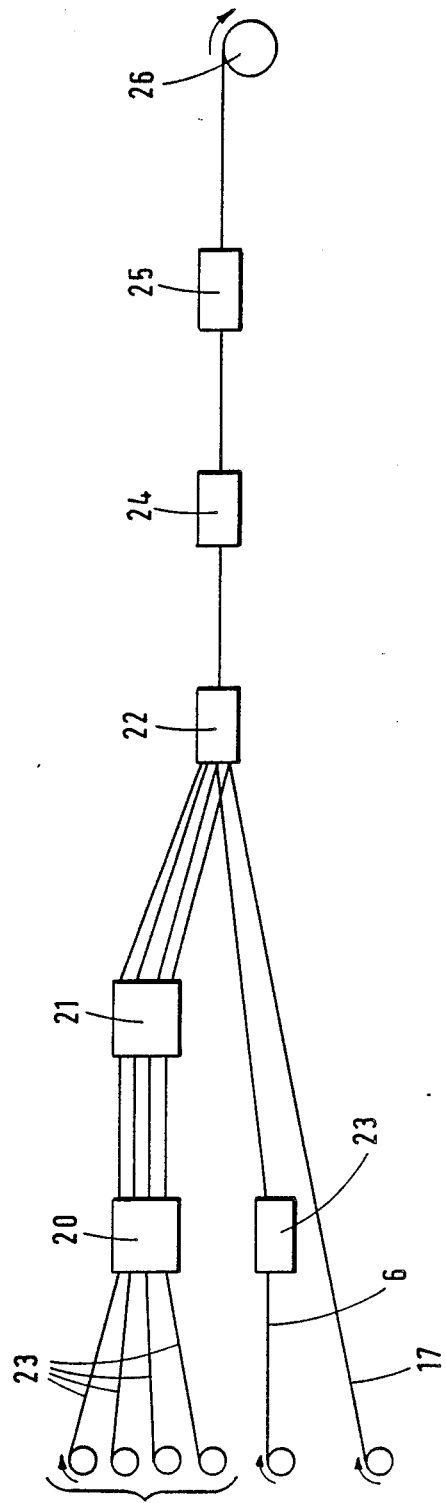
FIG. 12 is a schematic diagram of one form of process which may be used to produce a cable according to the present invention.

FIG. 12 shows a manufacturing process for producing a cable having the cross-section shown in FIG. 7 but with a central member similar to that shown in FIG. 5. Four optical fibers 2 with their acrylate coatings 3 already applied are fed to an extrusion head 20 where each has a sheath 4 of a foam or other low density material applied. The foam-coated fibers preferably pass from there to an optional surface-marking device 21 where surface markings are applied to the foam sheaths. For example a different color may be applied to each sheath so that it can subsequently be identified. The marked, foam-coated fibers are fed to a bundling device 22 to which are also fed a central member 6 and a rip cord 17. The central member 6 passes to the bundling device via a dip coater 23 in which an adhesive is applied to the central member 6 to enable the foam-coated fibers to adhere thereto in the bundling device. The bundling device serves to assemble the foam-coated fibers to the central member and may optionally impart a twist to the assembly.

The assembly passes to a coater 24 in which a film of latex or the like is applied. If desired, a coating of foam or the like could be applied instead of, or in addition to, the lateX film. The coated product passes to a surface marking device 25 where an identification legend or length marks are applied and is then wound on a spool 26 or other storage means.

In the foregoing reference has been made to fiber structures and cables as being "blowable". It is believed that it will be understood by those skilled in the art whether a given entity is or is not to be regarded as blowable. However, one test which can be employed for fiber structures or for two fiber cables is as follows. A 50 m length of duct having a circular internal cross-section 3.5 mm in diameter is wound in a single layer around the outside of a cylindrical drum 0.75 m in diameter. A 50 m length of the fiber structure or cable to be tested is then inserted completely into the duct by any suitable method, which may, but need not, be a blowing method.

An air flow of 9 standard liters/minute is then established down the duct. The time taken for the fiber structure or cable to emerge completely from the downstream end of the duct is recorded. If this fails to occur, or does so in a time greater than a pre-set time, the fiber structure or cable is regarded as not being blowable. The pre-set time may be as long as 1 hour, but is preferably not more than 10 minutes, more preferably not more than 5 minutes, and still more preferably not more than 1 minute. A fiber structure or cable which is highly blowable may emerge in as little as 20 seconds. For the purposes of the test, the static coefficient of friction between the fiber structure or cable and the duct is taken to be 0.15. If, in fact, the coefficient of friction is different, an appropriate modification is made to the times specified above.

The term "sheath" as used above is intended to denote a layer over and above the normal acrylate coating (external diameter 250 microns) with which a silica fiber is provided, or the equivalent in the case of an all-plastic fiber. The sheath will normally be distinct from the acrylate layer, and is so in the embodiments described above, but could be provided by the acrylate layer having a thickness significantly greater than normal.

The presence of a sheath on each individual fiber structure is, or may be, used to provide certain desirable properties. Thus, the increase in diameter makes the structure easier to handle. Where the sheath has a low bending modulus the overall stiffness of the structure is reduced. The sheaths can be color-coded or otherwise marked for easy identification. The presence of the sheaths increases the ability of the cable to withstanding crushing and other forms of mechanical attack, e.g. cutting.

We claim:

1. An optical fiber cable comprising a plurality of optical fiber structures each of which comprises an optical fiber surrounded by at least one sheath layer, the said optical fiber structures being separably held together side-by-side, the optical fiber cable being sufficiently lightweight and flexible to be propellable along a tubular pathway by fluid drag of a gaseous medium passing over the cable.

2. A cable according to claim 1, wherein each of the said structures is also propellable when the said structures are separated from one another.

3. A cable according to claim 1, wherein each of said fiber structures includes a layer of foam to reduce the overall density of the fiber structure.

4. A cable according to claim 1 wherein said fiber structures are arranged with their centers along a common plane when the cable is straight.

5. A cable according to claim 1, wherein the said fiber structures are arranged to form a closed array.

6. A cable according to claim 5, wherein a common supporting member surrounds the said fiber structures.

7. A cable according to claim 6, wherein a rip cord is provided in an interstice between adjacent fiber structures.

8. A cable according to claim 1, wherein each said sheath contains reinforcing fibers.

9. A cable according to claim 1, wherein the sheaths are of different colors to one another.

10. A cable according to claim 1, wherein said fiber structures are secured to a common supporting member.

11. A cable according to claim 5, wherein said closed array is a square.

* * * * *